US007468867B2

(12) United States Patent
Tokizaki et al.

(10) Patent No.: US 7,468,867 B2
(45) Date of Patent: Dec. 23, 2008

(54) DISK APPARATUS HAVING A NARROW MAGNETIC GAP

(75) Inventors: Tomoyuki Tokizaki, Ome (JP); Toshikuni Sato, Fussa (JP); Jun Shimizu, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 539 days.

(21) Appl. No.: 11/192,394

(22) Filed: Jul. 29, 2005

(65) Prior Publication Data
US 2006/0023348 A1 Feb. 2, 2006

(30) Foreign Application Priority Data
Jul. 30, 2004 (JP) ............... 2004-224489

(51) Int. Cl.
*G11B 5/55* (2006.01)
*G11B 21/08* (2006.01)
(52) U.S. Cl. .................... 360/264.9; 360/265
(58) Field of Classification Search ............ 360/97.01, 360/264.7, 264.8, 264.9, 265
See application file for complete search history.

(56) References Cited

U.S. PATENT DOCUMENTS

| 4,930,029 | A | * | 5/1990 | Morita ............. 360/97.01 |
| 5,005,095 | A | | 4/1991 | Wagner |
| 5,193,037 | A | * | 3/1993 | Pace ............ 360/264.8 |
| 5,483,400 | A | * | 1/1996 | Tsujino .......... 360/264.8 |
| 5,532,891 | A | * | 7/1996 | Tsujino .......... 360/264.7 |
| 5,600,517 | A | | 2/1997 | Whitmore |
| 6,125,016 | A | | 9/2000 | Lin |
| 6,347,023 | B1 | | 2/2002 | Suwa |
| 6,577,474 | B2 | * | 6/2003 | Kazmierczak et al. ... 360/264.9 |
| 7,196,874 | B2 | * | 3/2007 | Watanabe et al. ........ 360/264.8 |
| 2001/0048576 | A1 | * | 12/2001 | Kazmierczak ........... 360/264.7 |
| 2002/0063998 | A1 | * | 5/2002 | Kazmierczak et al. ... 360/264.9 |
| 2002/0191346 | A1 | * | 12/2002 | Oki et al. .............. 360/264.7 |
| 2003/0058582 | A1 | * | 3/2003 | Yanagihara ............. 360/264.8 |
| 2004/0052003 | A1 | * | 3/2004 | Watanabe et al. ........ 360/264.7 |
| 2004/0105190 | A1 | * | 6/2004 | Kim et al. ............... 360/264.7 |
| 2005/0099734 | A1 | * | 5/2005 | Rafaelof ................. 360/264.8 |
| 2005/0174698 | A1 | * | 8/2005 | Matsuda et al. .......... 360/264.7 |
| 2007/0025024 | A1 | * | 2/2007 | Iwahara ................. 360/264.8 |

FOREIGN PATENT DOCUMENTS

| CN | 1213136 | 4/1999 |
| CN | 1394381 | 1/2003 |
| EP | 0078911 A1 | 9/1982 |
| EP | 1282120 A2 | 2/2003 |
| JP | 4-17678 U | 2/1992 |

* cited by examiner

*Primary Examiner*—Brian E Miller
(74) *Attorney, Agent, or Firm*—Pillsbury Winthrop Shaw Pittman, LLP

(57) ABSTRACT

An HDD has a carriage which moves a head with respect to a medium, and a voice coil motor (VCM) which drives the carriage. The VCM has a magnet, between which and a first shell formed of a magnetic substance a magnetic circuit is formed, and a voice coil which is secured to the carriage and disposed in a magnetic gap. A depression which receives a projecting portion covering a lead of the voice coil is formed in the first shell, and thereby a projection projecting toward the coil is consequently formed. This structure partially narrows the magnetic gap and allows generation of a torque with sufficient intensity.

5 Claims, 7 Drawing Sheets

DISK APPARATUS HAVING A NARROW MAGNETIC GAP

CROSS-REFERENCE TO RELATED APPLICATIONS

This application is based upon and claims the benefit of priority from prior Japanese Patent Application No. 2004-224489, filed Jul. 30, 2004, the entire contents of which are incorporated herein by reference.

BACKGROUND OF THE INVENTION

1. Field of the Invention

This invention relates to a disk apparatus which records and reproduces information in a disk-shaped medium.

2. Description of the Related Art

Recently, disk apparatuses such as magnetic disk apparatuses and optical disk apparatuses have been widely used as an external recording apparatus and an image recording apparatus of a computer.

Generally, magnetic disk apparatuses have a rectangular housing. Such a housing accommodates a magnetic disk serving as a magnetic recording medium, a spindle motor which supports and rotates the magnetic disk, a plurality of magnetic heads which write and read information in (from) the magnetic disk, a head actuator which movably supports the magnetic heads with respect to the magnetic disk, a voice coil motor which rotates and positions the head actuator, and a board unit having a head IC, etc.

Generally, the voice coil motor has a coil provided on a proximal end side of rotation of the head actuator, a pair of magnets arranged in positions to hold the coil therebetween, and a pair of yokes provided in correspondence with the respective magnets. The torque constant of the voice coil motor, which indicates a generated torque for a value of an electric current flowing through the coil, depends on magnetic flux density acting on the coil. For example, a generated torque is increased by reducing the magnetic gap between the pair of magnets and increasing the magnetic flux density, and thereby it is possible to provide a voice coil motor with good efficiency.

However, in the voice coil motor having the above structure, it is necessary to draw a lead for feeding a current to the coil through the magnetic gap, and thus it is difficult to reduce the magnetic gap to a satisfactory value. In comparison with this, a motor apparatus is proposed, in which magnets forming a magnetic gap are worked to have a recessed portion to let the lead through, and consequently the magnetic gap is reduced (for example, refer to Jpn. U.M. Appln. KOKAI Pub. No. 4-17678).

However, in the above apparatus, since a part of the magnets have to be cut away to form the recessed portion, the cost for manufacturing the motor is increased. Further, it is technically difficult to work the magnets.

BRIEF SUMMARY OF THE INVENTION

The object of the present invention is to provide a disk apparatus which can easily increase generation torque of an actuator with low cost.

To achieve the above object, a disk apparatus according to the present invention comprises: a housing formed of a magnetic substance; a disk-shaped medium which is rotatably provided in the housing; a head which records information in the medium and reproduces information from the medium; and an actuator which moves the head along the medium, wherein the actuator has a coil which is provided as one unitary piece with the actuator and disposed in a magnetic gap between the housing and a magnet, a magnetic field is formed between the magnet and the housing, and the housing has a projection partially projecting toward the coil, in a part which does not interfere with the actuator.

According to the present invention, the housing forming a magnetic circuit with the magnet has a projection partially projecting toward the coil. This structure at least partially reduces the magnetic gap in comparison with the case of having no projection, and thus heightens the magnetic flux density acting on the coil and increases the generation torque.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitutes a part of the specification, illustrate embodiments of the invention, and together with the general description given above and the detailed description of the embodiments given below, serve to explain the principles of the invention.

DETAILED DESCRIPTION OF THE INVENTION

As a disk apparatus according to an embodiment of the present invention, a hard disk drive (hereinafter referred to as "HDD") is explained in detail below with reference to drawings.

Figure 1:
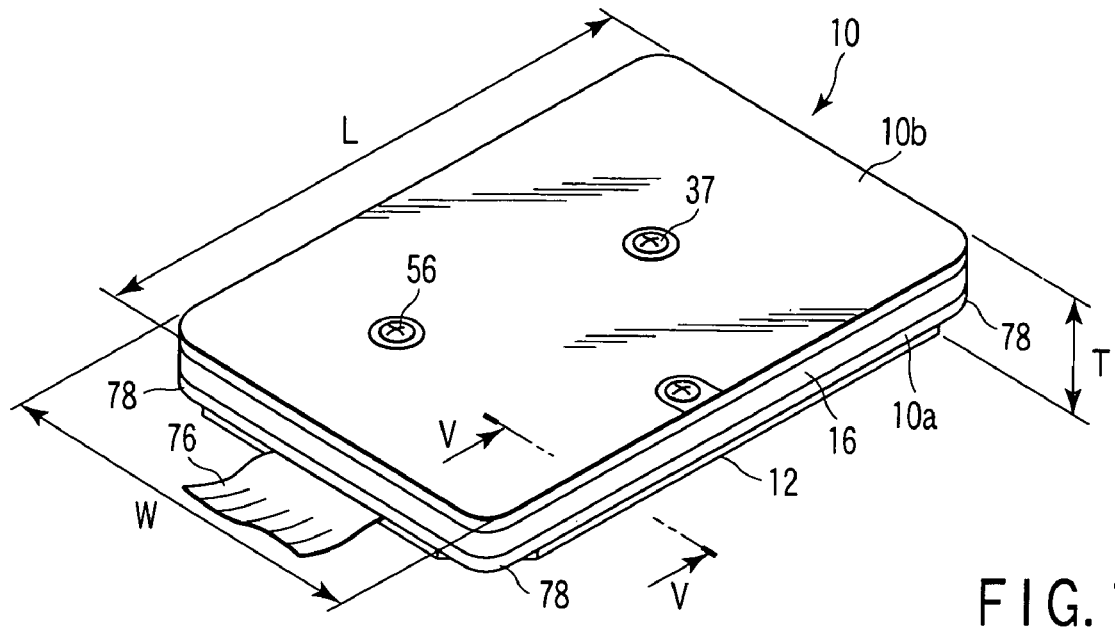
FIG. 1 is a perspective view of an HDD according to an embodiment of the present invention.
Figure 2:
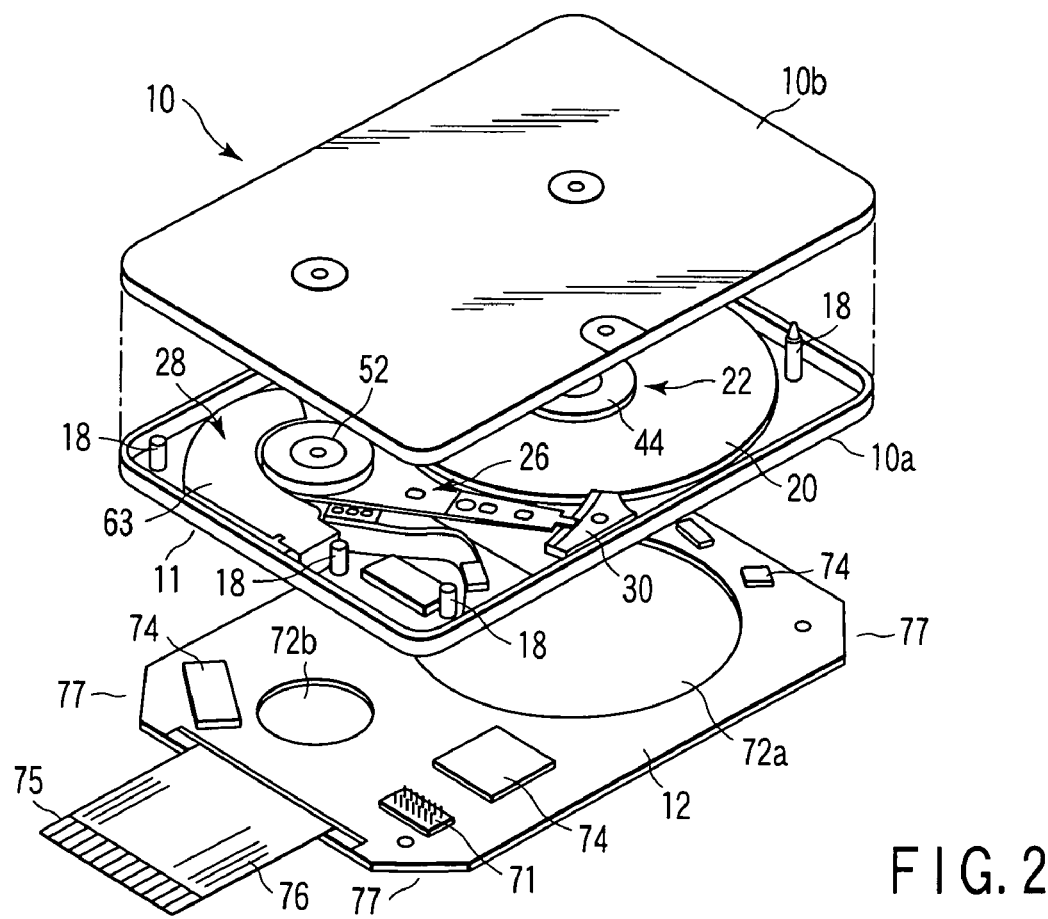
FIG. 2 is an exploded perspective view of the HDD of FIG. 1.

As shown in FIGS. 1 and 2, the HDD comprises an almost rectangular box-shaped housing 10 accommodating various members described below, and a rectangular control circuit board 12 provided in a superposed manner on an external surface of the housing 10. The housing 10 and the control circuit board 12 are formed to have a length L of 32 mm, and a width W of 24 mm, for example. A thickness T including the housing and the control circuit board is set to 3.3 mm or about 5 mm, for example, according to the number of disks which are accommodated.

As shown in FIGS. 2 to 5, the housing 10 comprises a first shell 10a and a second shell 10b, which are formed to have almost the same size each other. Each of the first and second shells 10a and 10b is formed of magnetic substance in an almost rectangular shape, and has side walls standing in its edge portions. The first and the second shells 10a and 10b are arranged to be opposed to each other in the state where their edge portions are opposed to each other. A band-shaped sealing material 16 is wound around the edge portions of the first and second shells 10a and 10b. The seal material joins their edge portions together, and seals the gap between the edge portions. Thereby, the sealed housing 10 having a rectangular box shape is formed.

A bottom surface of the first shell 10a serves as an almost rectangular mounting surface 11. Four corners of the housing 10 including the corners of the mounting surface 11 are rounded off to have an arc shape. This prevents the sealing material 16 wound around the edge portions of the housing 10 from being damaged by the corners of the housing, and prevents deterioration in the airtightness due to separation of the seal material from the edge portions.

In the housing 10, a plurality of supporting posts 18 are provided in peripheral portions of the housing. Each of the supporting posts 18 has a proximal end fixed onto the internal surface of the first shell 10a, and is stood almost vertically to the internal surface of the first shell. Screw holes are formed on the mounting surface 11 in positions corresponding to the respective supporting posts 18, and extend into the respective supporting posts.

The housing 10 accommodates a magnetic disk 20 which functions as a disk-shaped medium and having a diameter of, for example, 0.85 inches, a spindle motor 22 which supports and rotates the magnetic disk 20, a magnetic head 24 (head) which reads information from, and write information in, the magnetic disk 20, a carriage 26 which movably supports the magnetic head 24 with respect to the magnetic disk 20, a voice coil motor (hereinafter referred to as "VCM") 28 which serves as a drive motor rotating and positioning the carriage 26, a ramp load mechanism 30 which unloads the magnetic head from the magnetic head and holds the magnetic head in a position away from the magnetic disk, an electromagnetic latch mechanism 32 which holds the carriage in a receded position, and a board unit 34 having a head IC and the like. The carriage 26 and the VCM 28 function as an actuator of the present invention which moves the magnetic head 24 along the magnetic disk 20.

The spindle motor 22 is attached to the first shell 10a. The spindle motor 22 has a pivot 36. The pivot 36 is fixed onto the internal surface of the first shell 10a, and stood almost vertically to the internal surface. An extending end of the pivot 36 is secured to the second shell 10b by a fixing screw 37 screwed from the outside of the second shell 10b. Thereby, the pivot 36 is held at both ends by the first and second shells 10a and 10b.

A rotor is rotatably attached to the pivot 36 via a bearing (not shown). A cylindrical hub 43 is provided on an end portion of the rotor on the second shell 10b side, and the magnetic disk 20 is coaxially fitted with the hub 43. A ring-shaped clamp ring 44 is fitted onto an end portion of the hub 43, and holds the magnetic disk 20. Thereby, the magnetic disk 20 is secured to the rotor to be movable together with the rotor.

A ring-shaped permanent magnet (not shown) is fixed onto an end portion of the rotor on the first shell 10a side in a coaxial manner with the rotor. The spindle motor 22 has stator cores attached to the first shell 10a, and a plurality of coils wound around the respective stator cores. The stator cores with the coils are arranged with intervals outside the permanent magnet.

The carriage 26 forming a head actuator has a bearing assembly 52 fixed onto the internal surface of the first shell 10a. The bearing assembly 52 has a pivot 53 which is stood vertically to the internal surface of the first shell 10a, and a cylindrical hub 54 which is rotatably attached to the pivot 53 via a pair of bearings. An extending end of the pivot 53 is secured to the second shell by a fixing screw 56 screwed from the outside of the second shell 10b. Thereby, the pivot 53 is held at both ends by the first and second shell 10a and 10b. The bearing assembly 52 serving as a bearing part is almost aligned with the spindle motor 22 in the longitudinal direction of the housing 10.

The carriage 26 has an arm 58 extending from the hub 54, a suspension 60 having an elongated plate shape and extending from a distal end of the arm, and a supporting frame 62 extending from the hub 54 in a direction opposite to the arm. The magnetic head 24 is attached to an extending end of the suspension 60 with a gimbal portion (not shown) interposed therebetween. A fixed head load is applied to the magnetic head 24 toward the surface of the magnetic disk 20 by spring force of the suspension 60. A voice coil 64 (coil) forming the VCM 28 is fixed onto the supporting frame 62 as one unitary piece.

The VCM 28 that rotates the carriage 26 around the bearing assembly 52 has a top yoke 63 which is opposed to and away from the internal surface of the first shell 10a as described below, and a magnet 81 which is fixed to the internal surface of the top yoke 63 and opposed to the voice coil 64 (described below). In this embodiment, the first shell 10a is formed by working a magnetic substance such as a cold-rolled steel plate and a SUS 430, and thus the first shell 10a functions as a bottom yoke, and forms a magnetic circuit with the top yoke 63 having the magnet 81.

Figure 3:
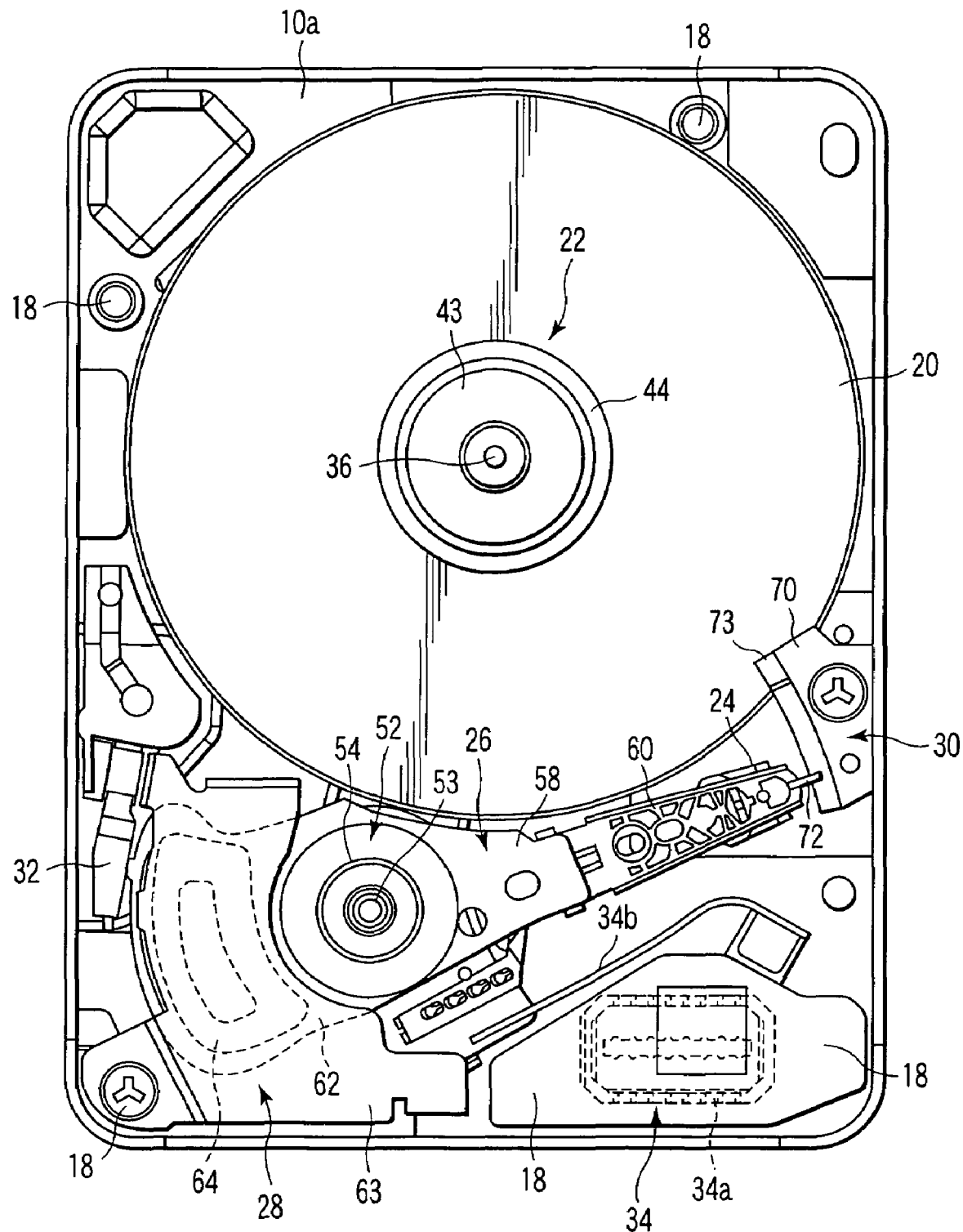
FIG. 3 is a plan view of a housing and an internal structure of the HDD of FIG. 1.

When the voice coil 64 is energized, the carriage 26 rotates between the receded position shown in FIG. 3 and an operating position in which the carriage 26 is located on the surface of the magnetic disk 20, and the magnetic head 24 is positioned on a desired track of the magnetic disk 20.

The electromagnetic latch mechanism 32 fixed onto the first shell 10a latches the carriage 26 which has moved to the receded position, and prevents the carriage 26 from moving from the receded position to the operating position when the HDD receives external force such as physical shock.

The ramp load mechanism 30 has a ramp member 70 which is fixed onto the internal surface of the first shell 10a and opposed to the edge portion of the magnetic disk 20, and a tab 72 which functions as an engaging member extending from the distal end of the suspension 60. The ramp member 70 is manufactured by molding resin, and has a ramp surface 73 with which the tab 72 can be engaged. When the carriage 26 rotates from the inner radius of the magnetic disk 20 to the receded position in the outer radius of the magnetic disk, the tab 72 is engaged with the ramp surface 73 of the ramp member 70. Then, the tab 72 is pulled up by slope of the ramp surface, and thereby the magnetic head 24 is unloaded. When the carriage 26 is moved to the receded position, the tab 72 is supported on the ramp surface 73 of the ramp member 70, and the magnetic head 24 is retained in a state away from the surface of the magnetic disk 20.

The board unit 34 has a main body 34a formed of a flexible printed circuit board. The main body 34a is fixed onto the internal surface of the first shell 10a. Electronic components such as a head IC and a head amplifier are mounted on the main body 34a. The board unit 34 has a main flexible printed circuit board (hereinafter referred to as "main FPC") 34b extending from the main body 34a. An extending end of the main FPC 34b is connected to the vicinity of the bearing assembly 52 of the carriage 26, and electrically connected to the magnetic head 24 via a cable (not shown) provided on the arm 58 and the suspension 60. A connector 34c to be connected with the control circuit board 12 is mounted on a bottom surface of the main body of the board unit 34. The connector 34c is exposed to the mounting surface 11 of the first shell through an opening formed in the first shell 10a.

Figure 4:
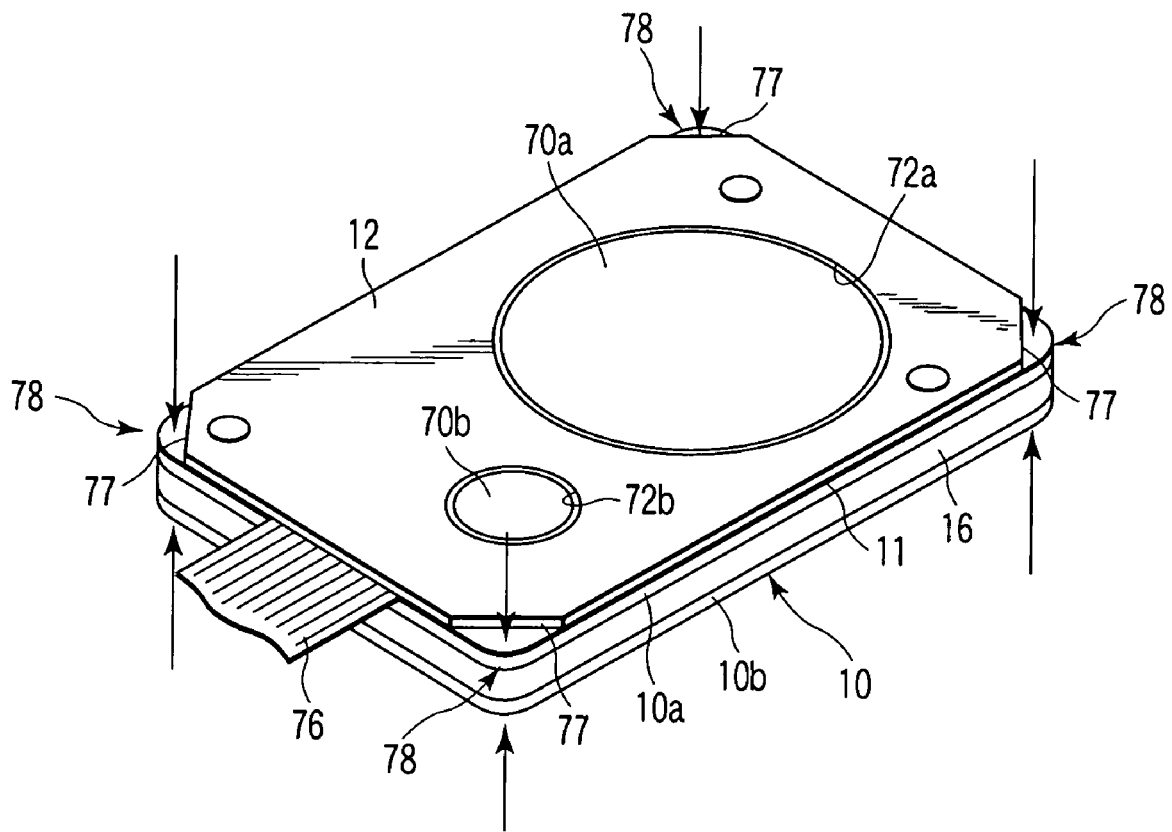
FIG. 4 is a perspective view of a control circuit board side of the HDD of FIG. 1.
Figure 5:
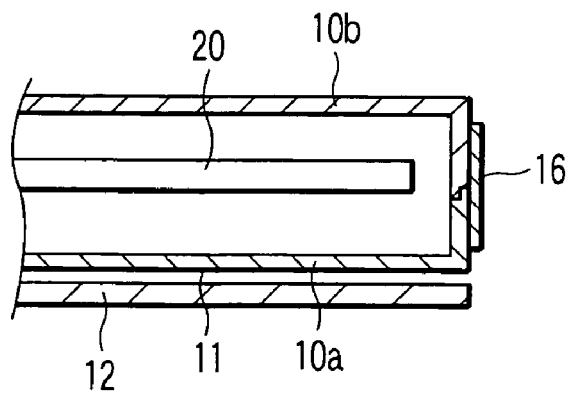
FIG. 5 is a cross-sectional view of the HDD taken along line V-V shown in FIG. 1.

As shown in FIGS. 2 and 4, the control circuit board 12 formed of a printed circuit board has an almost rectangular shape with a length and a width which are almost equal to those of the mounting surface 11 of the housing 10. In the mounting surface 11 of the housing 10, formed are a circular projecting portion 70a corresponding to the spindle motor 22, and a circular projecting portion 70b corresponding to the bearing assembly 52. In the control circuit board 12, formed are circular openings 72a and 72b, which correspond to the projecting portions 70a and 70b, respectively. Each of four corners of the control circuit board 12 is cut away at an angle of 45° with each side and forms a cut-away portion 77.

A plurality of electronic components 74 and a connector 71 are formed on an internal surface of the control circuit board 12, that is, a surface facing the housing 10. Further, the control circuit board 12 is connected with a flexible printed circuit board 76 for electrically connecting the HDD with an external apparatus. The flexible printed circuit board 76 is pulled out from one of shorter sides of the control circuit board 12. A plurality of connecting terminals 75 are formed on an extending end of the flexible printed circuit board 76.

The control circuit board 12 having the above structure is arranged in a superposed manner on the mounting surface 11 of the housing 10, and secured to the first shell 10a by screws. The control circuit board 12 is arranged in a state where four sides thereof are aligned with the respective sides of the mounting surface 11, that is, coincide with the respective sides of the mounting surface 11. The projecting portions 70a and 70b formed on the mounting surface 11 are positioned in the openings 72a and 72b, respectively, of the control circuit board 12. The connector 71 mounted on the control circuit board 12 is connected to the connector of the board unit 34.

The cut-away portions 77 formed on the four corners of the control circuit board 12 are arranged on the respective corners of the mounting surface 11. This structure allows the four corner portions of the mounting surface 11 to be exposed to the outside without being covered by the control circuit board 12. The corner portions of the housing 10 including the exposed four corners of the mounting surface 11 functions as holding portions 78 for holding the housing without contacting the contact circuit board 12.

Figure 7:
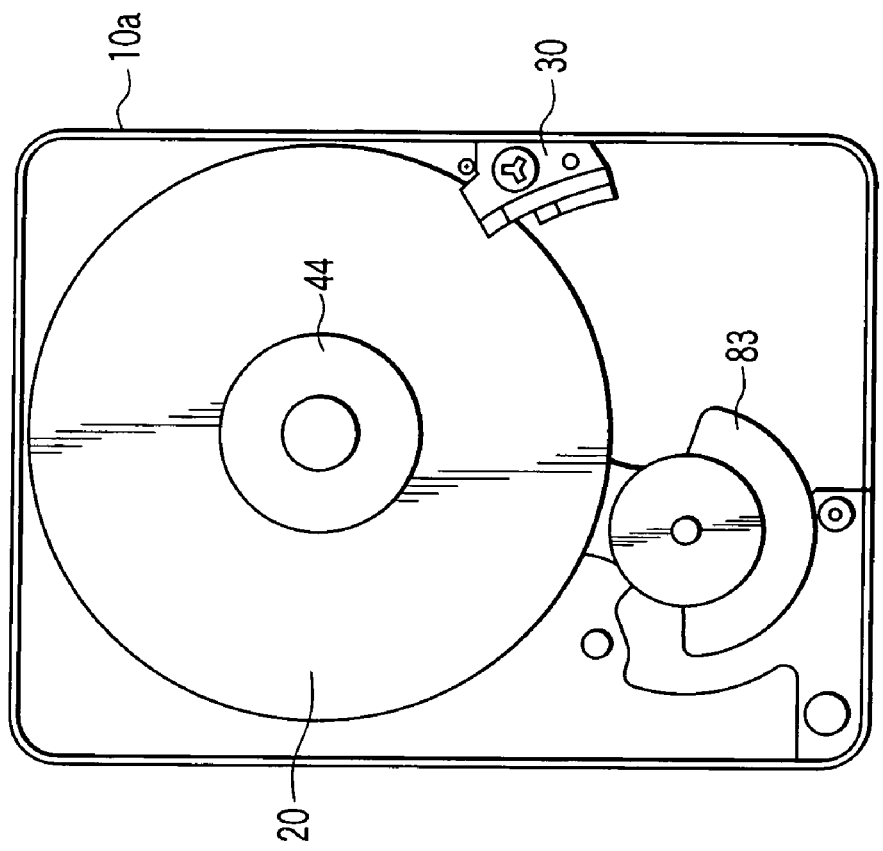
FIG. 7 is a plan view of the HDD, illustrating the state where a carriage is further removed from the structure shown in FIG. 6.
Figure 6:
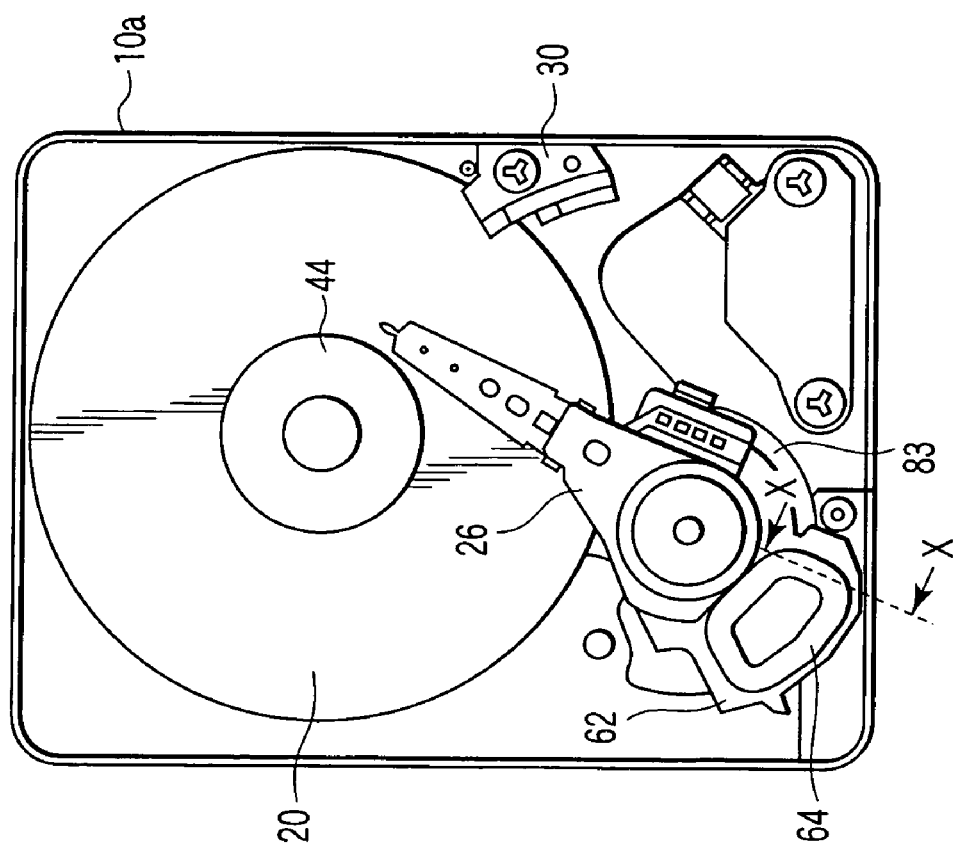
FIG. 6 is a plan view of a structure of a main part of the HDD in the state where a second shell, a top yoke, and a magnet are removed.
Figure 8:
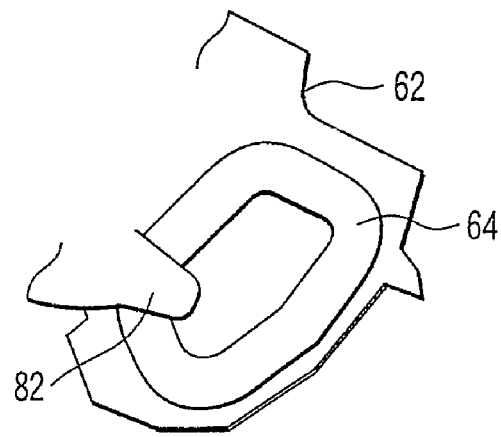
FIG. 8 is a bottom view illustrating a supporting frame of the removed carriage and the vicinity thereof.

FIG. 6 is a plan view of a structure of a main part of the HDD in which the second shell 10b, the top yoke 28 and the magnet 81 are removed from the housing 10. FIG. 7 illustrates the state where the carriage 26 is further removed. FIG. 8 is a bottom view of a part of the removed carriage 26, including the supporting frame 26, viewed from the first shell 10a side.

As shown in FIG. 8, a projecting portion 82 is provided on the bottom surface side of the carriage 26. The projecting portion 82 covers the lead drawn from the voice coil 64 provided on the supporting frame 62. The projecting portion 82 is indispensable, since the lead is indispensable for feeding a current to the voice coil 64. Therefore, as shown in FIG. 7 with the carriage 26 removed, an arched depression 83 through which the projecting portion 82 is moved is formed in the internal surface of the first shell 10a.

Figure 9:
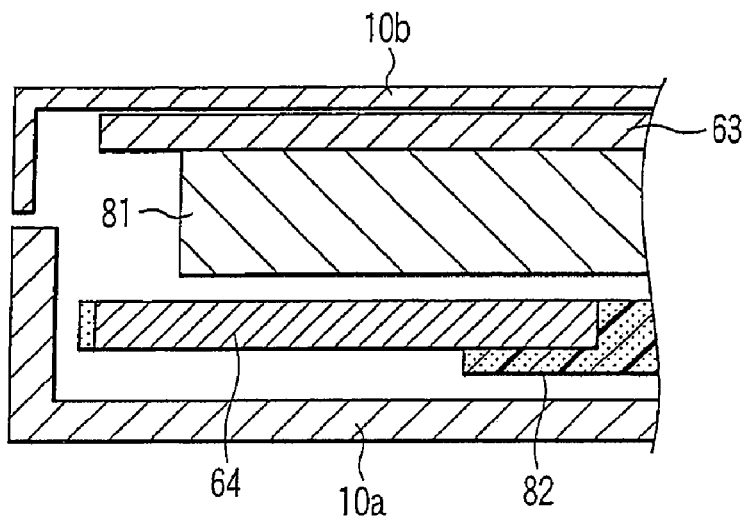
FIG. 9 is a partial enlarged cross-sectional view of a structure of a conventional HDD in which no depression is formed in a first shell.

In other words, the projecting portion 82 of the carriage 26 defines the height of the carriage 26 in the gap direction, when the voice coil 64 is arranged in the magnetic gap between the first shell 10a and the magnet 81. Specifically, the projecting portion 82 widens the magnetic gap. A wide magnetic gap decreases the magnetic flux density, and the generated torque of the VCM 28. For example, if no depression 83 is provided in the facing portion of the first shell 10a as shown in FIG. 9, the projecting portion 82 enlarges the magnetic gap, greatly decreases the magnetic flux density acting on the voice coil 64, and decreases the generation torque.

Figure 10:
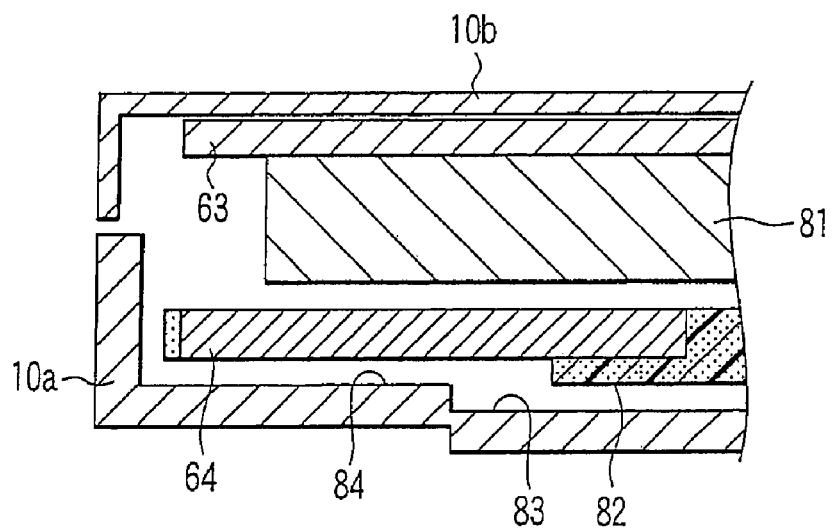
FIG. 10 is a partial enlarged cross-sectional view of the embodiment of the present invention, in which a depression is formed in a first shell.

Therefore, in the embodiment of the present invention, the depression 83 for receiving the projection 82 provided on the bottom surface side of the supporting frame 62 is formed in the first shell 10a as shown in FIG. 10. Providing the depression 83 consequently forms a projection 84 projecting toward the voice coil 64 to at least partially reduce the magnetic gap. This structure suppresses decrease in the magnetic flux density to the minimum. Thus, this structure can retain high magnetic reflux density acting on the voice coil 64, and secure a sufficient generated torque, in comparison with the case where the first shell 10a is not worked as shown in FIG. 9.

Figure 12:
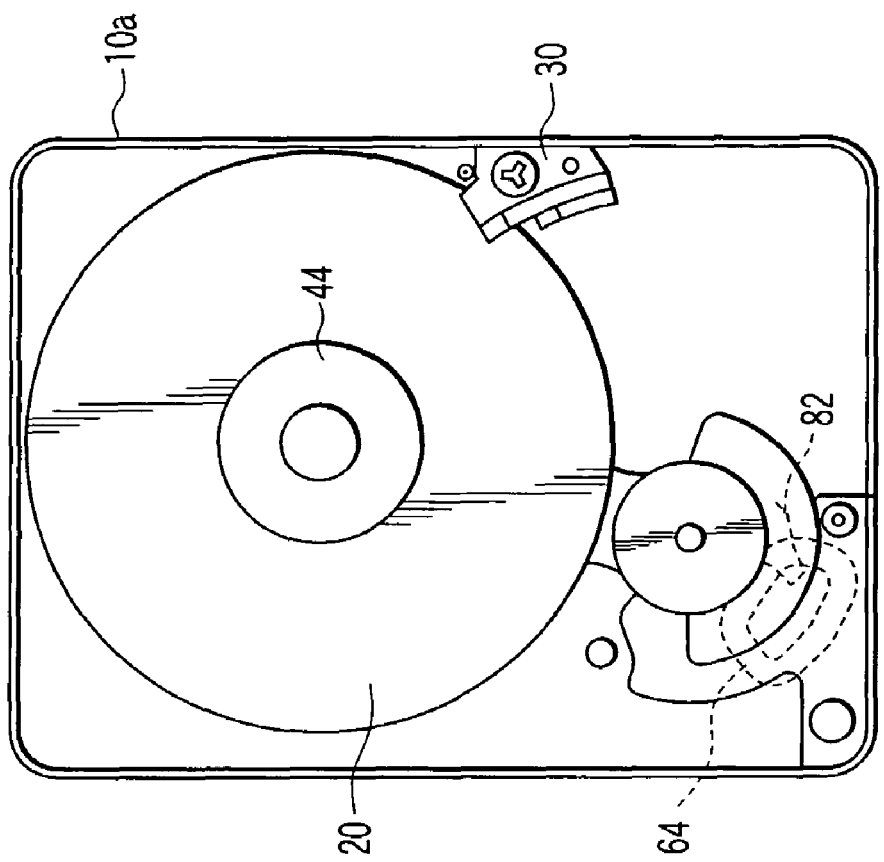
FIG. 12 is a diagram illustrating a positional relationship between the recessed portion and the voice coil when the carriage is positioned at the innermost periphery.
Figure 11:
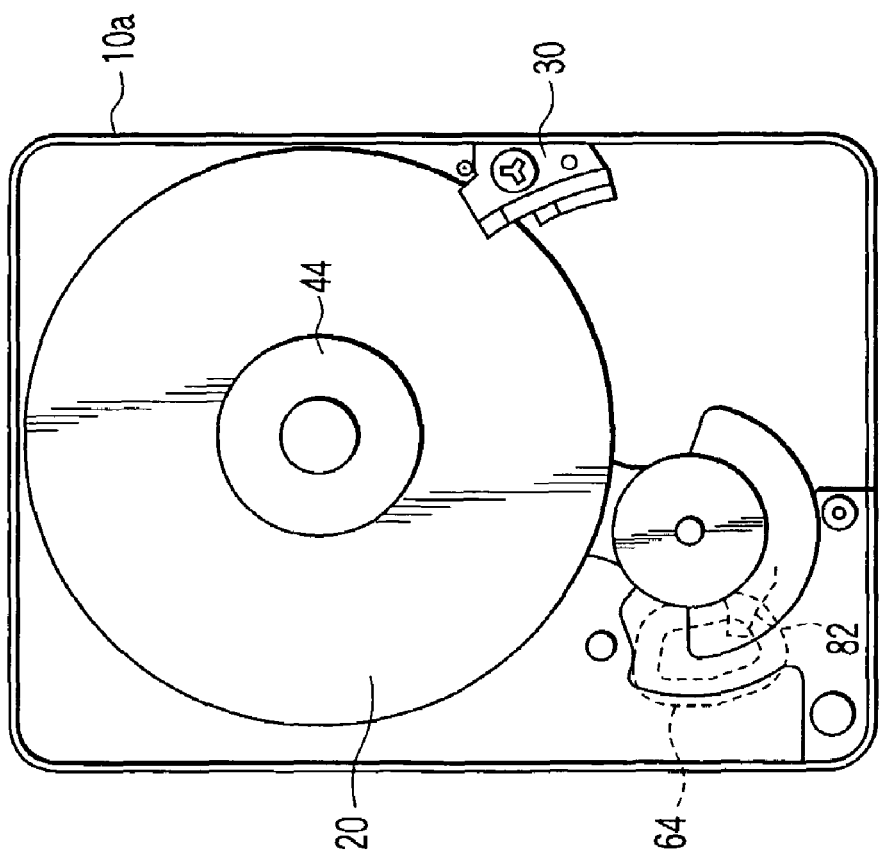
FIG. 11 is a diagram illustrating positional relationship between the depression and a voice coil when the carriage is positioned at the outermost periphery.
Figure 13:
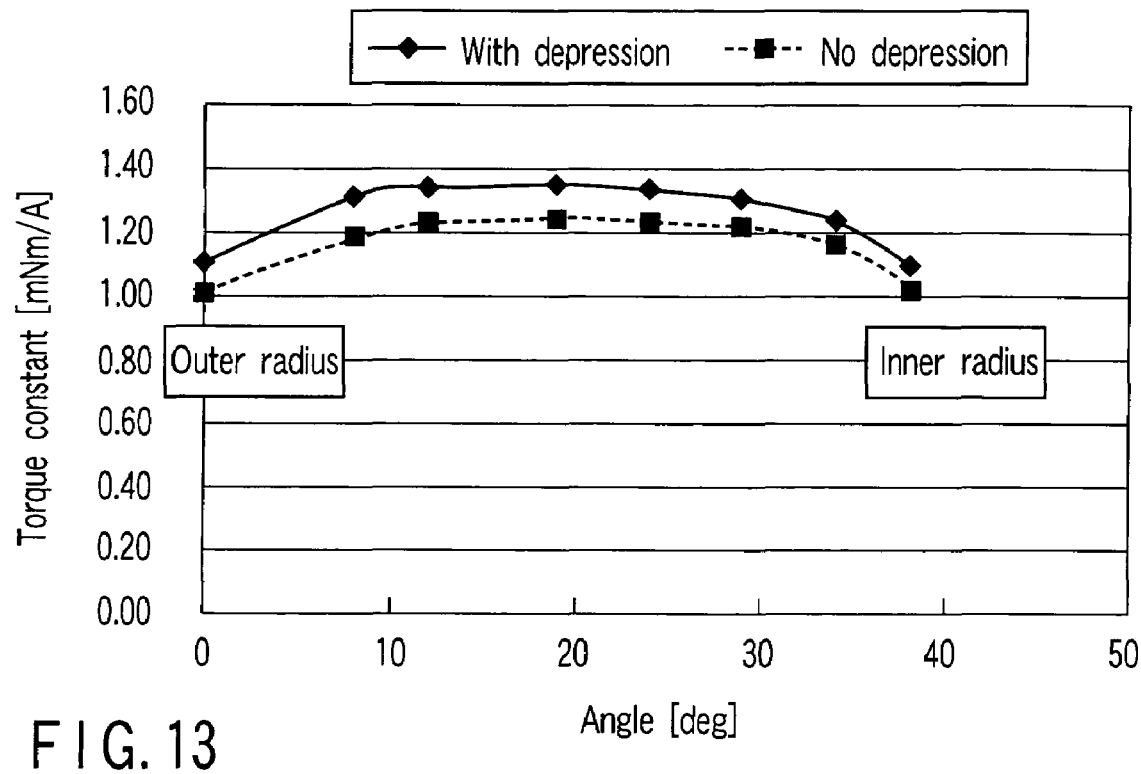
FIG. 13 is a graph illustrating a torque constant when the depression is provided in comparison with a torque constant when no depression is provided.
Figure 14:
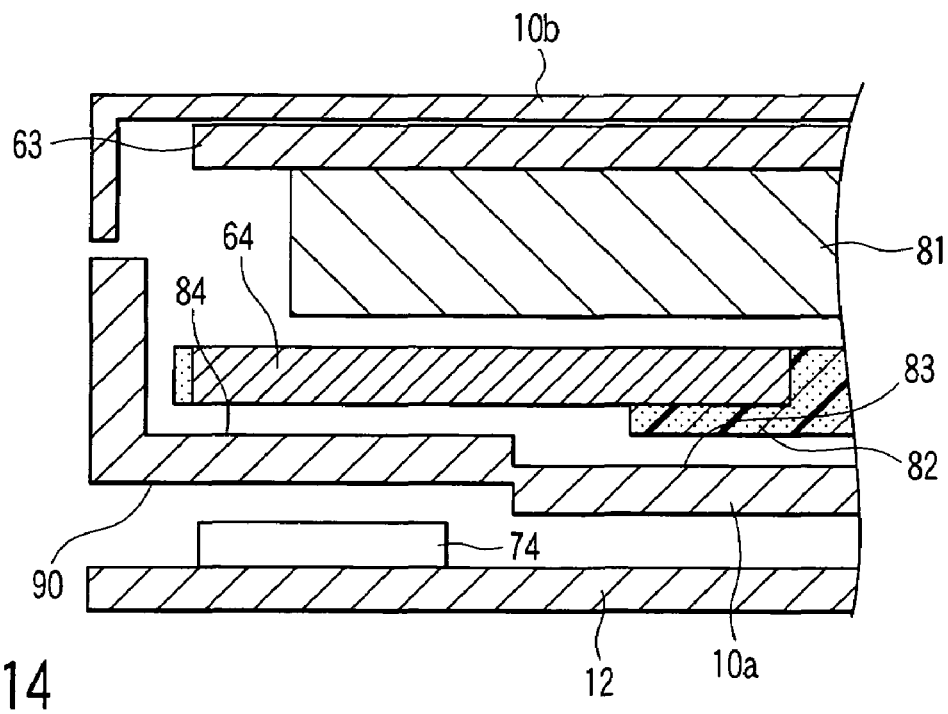
FIG. 14 is a partial enlarged cross-sectional view of the HDD, illustrating an example in which an electronic part is disposed in a depressed portion on the back of a projecting portion.

The torque constant in the case where the depression 83 is provided in the first shell 10a was obtained by numerical calculation. The torque constant indicates a torque generated by unit current when the carriage 26 is rotated from the outermost position to the innermost position. FIG. 11 illustrates the voice coil 64 in the outermost position with broken lines. FIG. 12 illustrates the voice coil 64 in the innermost position with broken lines. According to the structure of the present invention in which the magnetic gap G is at least partially narrowed by the depression 83 in the first shell 10a to receive the projecting portion 82 as shown in FIG. 10, the torque constant exhibited values indicated by a solid line in FIG. 13. In comparison with this, if no depression 83 is provided as shown in FIG. 9, the torque constant under the same conditions exhibited values indicated by a broken line in FIG. 13. Specifically, the experiment result shows that providing the first shell 10a with the depression 83 increases the torque constant.

As described above, according to this embodiment, the first shell 10a of the housing 10 is formed of magnetic substance such that a magnetic circuit of the VCM 28 is formed between the first shell 10a and the magnet 81, and a part of the first shell 10a is elevated toward the voice coil 64. Therefore, it is possible to easily obtain the VCM 28 having a sufficient magnetic flux density with low cost, only by pressing the first shell 10a to form the depression 83.

The present invention is not limited to the above embodiment, but can be realized in carrying out it by modifying the constituent elements without diverting from the gist of the invention. Further, various inventions can be made by combining some of constituent elements disclosed in the embodiment according to necessity. For example, some constituent elements can be deleted from all the constituent elements disclosed in the embodiment. Further, constituent elements disclosed in different embodiments can be combined.

For example, the depression 83 is formed in the first shell 10a as described above, and thereby it is possible to secure a space for receiving an electronic component in a depressed portion 90 provided on the back of the projection 84. For example, an electronic component 74 mounted on the control circuit board 12 is disposed in this space.

Further, although the first shell 10a is worked to have the depression 83 and the projection 84 in the above embodiment, the present invention is not limited to it, but the projection 84 may be formed by bonding another plate-shaped member formed of a magnetic substance to the internal surface of the first shell 10a. In this case, although a depressed portion 90 is not formed on the back of the projection 84, it is possible to partially reduce the magnetic gap as in the above embodiment, and provide a VCM having a sufficient generation torque.

Further, the number of magnetic disk is not limited to 1, but can be increased if necessary. The number of the head is not limited to 1, but can be increased if necessary. The size of the magnetic disk is not limited to 0.85 inches, but may be set to 1.8 inches or 2.5 inches.

What is claimed is:

1. A disk apparatus comprising:
a housing formed of a magnetic substance;
a disk-shaped medium which is rotatably provided in the housing;
a head which records information in the medium and reproduces information from the medium; and
an actuator which moves the head along the medium,
wherein
the actuator has a coil which is provided as one unitary piece with the actuator;
a projecting portion which covers a lead of the coil is provided on the actuator,
the coil and the projecting portion are disposed in a magnetic gap between the housing and a magnet,
a magnetic field is formed between the magnet and the housing,
the housing has a depression and a protection,
the depression and the projection are located opposite to the magnet, with the magnetic gap interposed therebetween, and a gap between the depression and the magnet is greater than a gap between the projection and the magnet,
the projecting portion is located between the depression and the magnet to prevent interference between the housing and the projecting portion, and
the projection is formed by pressing the housing.

2. A disk apparatus according to claim 1, further comprising:
a control circuit board bonded to an external surface of the housing,
wherein
an electronic component mounted on the control circuit board is accommodated in a depressed portion formed on the back of the projection by pressing.

3. A disk apparatus comprising:
a housing formed of a magnetic substance;
a disk-shaped medium which is rotatably provided in the housing;
a head which records information in the medium, and reproduces information from the medium; and
an actuator which moves the head along the medium,
wherein
the actuator has a coil which is provided as one unitary piece with the actuator,
a projecting portion which covers a lead of the coil is provided on the actuator,
the coil and the projecting portion are disposed in a magnetic gap between the housing and a magnet,
a magnetic field is formed between the magnet and the housing,
the housing has a depression and a projection,
the depression and the projection are located opposite to the magnet, with the magnetic gap interposed therebetween, and a gap between the depression and the magnet is greater than a gap between the projection and the magnet,
the projecting portion is located between the depression and the magnet to prevent interference between the housing and the projecting portion, and
the projection is formed by pressing the housing.

4. A disk apparatus comprising:
a housing formed of a magnetic substance;
a disk-shaped medium which is rotatably provided in the housing;
a head which records information in the medium and reproduces information from the medium; and
an actuator which moves the head along the medium,
wherein
the actuator has a coil which is provided as one unitary piece with the actuator,
a projecting portion which covers a lead of the coil is provided on the actuator,
the coil and the projecting portion are disposed in a magnetic gap between the housing and a magnet,
a magnetic field is formed between the magnet and the housing,
the housing has a first shell to which the medium and the actuator are rotatably attached, and a second shell between which and the first shell a sealed space is formed,
the first shell has a depression and a projection,
the depression and the projection are located opposite to the magnet through the magnetic gap, and a gap between the depression and the magnet is greater than a gap between the projection and the magnet,
the projecting portion is located between the depression and the magnet to prevent interference between the housing and the projecting portion, and
the projection is formed by pressing the first shell.

5. A disk apparatus according to claim 4, further comprising:
a control circuit board bonded to an external surface of the housing,
wherein
an electronic component mounted on the control circuit board is accommodated in a depressed portion formed on the back of the projection by pressing.

* * * * *